Dec. 5, 1933.  J. E. HAMACHECK  1,938,252
COOLER FOR FUEL GASES
Filed Dec. 9, 1929  2 Sheets-Sheet 1

Inventor
J. E. Hamacheck
By
Attorneys

Dec. 5, 1933.  J. E. HAMACHECK  1,938,252
COOLER FOR FUEL GASES
Filed Dec. 9, 1929   2 Sheets-Sheet 2

Inventor
J. E. Hamacheck
By
Attorneys

UNITED STATES PATENT OFFICE 1,938,252

COOLER FOR FUEL GASES

Julius E. Hamacheck, Sheboygan, Wis.

Application December 9, 1929. Serial No. 412,841

2 Claims. (Cl. 123—122)

This invention relates to improvements in coolers for fuel gases and more particularly to a cooler which is adapted to be arranged between the carburetor and the intake manifold of an internal combustion engine.

It is quite well known that the gasoline fuel used at the present time contains a great portion of heavy gas which is due to the present manufacturing or cracking process, so that it is necessary to provide considerable heating facilities for properly heating the fuel before it is taken into the intake manifold of an internal combustion engine. This heating process of the fuel for generating a gaseous mixture is expanded to a great extent, so that when it enters the cylinder, the expansion is not as great as it would be if it were not necessary to heat the gas to such a high temperature in order to create the proper gaseous mixture.

It is one of the objects of my invention to provide a cooler which is arranged between the intake manifold and the carburetor so that after the liquid fuel has been mixed with the air and then heated to a high temperature in order to produce the proper mixture of fuel and air, it will be passed through this cooler so as to cool the gaseous mixture before it enters the cylinders, whereby a greater volume will enter the cylinders and a greater amount of expansion will take place within the cylinders when the fuel is fired, thus increasing the power of the motor by quite a substantial margin.

Another object of the invention is an improved method of treating volatile fluid for internal combustion engines which consists of heating the fuel and air mixture to a comparatively high temperature for thoroughly mixing the same and then cooling the mixture prior to discharging the same into the cylinders of the engine so as to reduce the expanded gases and discharge them into the cylinder under volume so that after they are fired, it will produce a greater expansion in the engine cylinders.

A further object of my invention is the provision of a gas cooler which includes a tubular conduit provided with a water cooling jacket and, arranged in the conduit at its intake end is a substantially spiral-like member for directing the heated and expanded gases against the walls of the conduit whereby to bring the gaseous mixture into direct contact with the cool walls of the conduit so that the mixture will be cooled, and as the cooled mixture reaches the discharge end of the conduit which leads into the intake manifold, it will encounter a spiral member which will direct the gases in the opposite direction from the first spiral, and as the second spiral ends up with the flat blade-like portion parallel with the manifold, it will have a tendency to stop the whirling movement of the gaseous mixture and discharge the same into the manifold in such a manner that it will be equally distributed to the different cylinders of the engine.

A still further object of the invention is the provision of a gas cooler of the above type which can be quickly incorporated in various makes of well known motor vehicles, so that the heated mixed gases can be cooled to a certain degree before they enter the engine cylinders so as to obtain the maximum of expansion from the gases after they have been fired in the cylinders.

With the above and other objects in view, the invention consists in the novel features of construction, the combination and arrangement of parts hereinafter more fully set forth, pointed out in the claims and shown in the accompanying drawings wherein:

Figure 1:
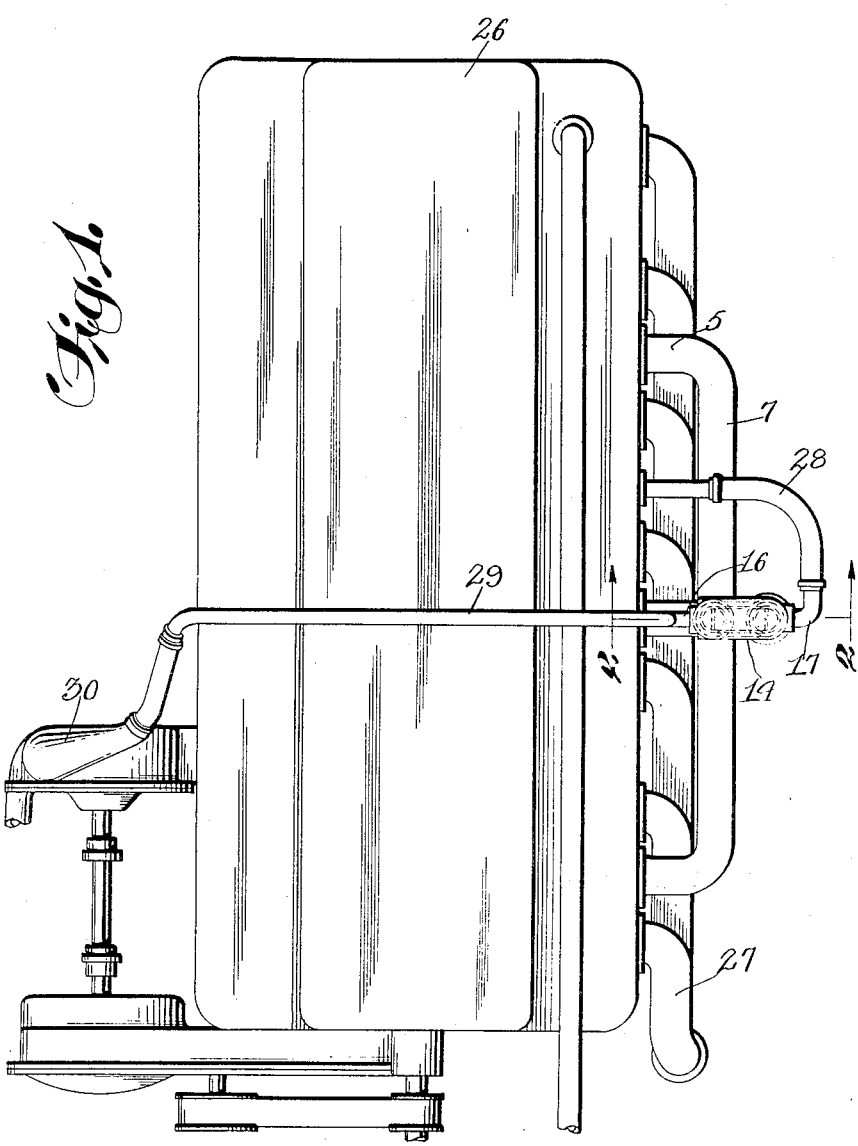
Figure 1 is a top plan view of an internal combustion engine, illustrating the application of my improved cooler.
Figure 2:
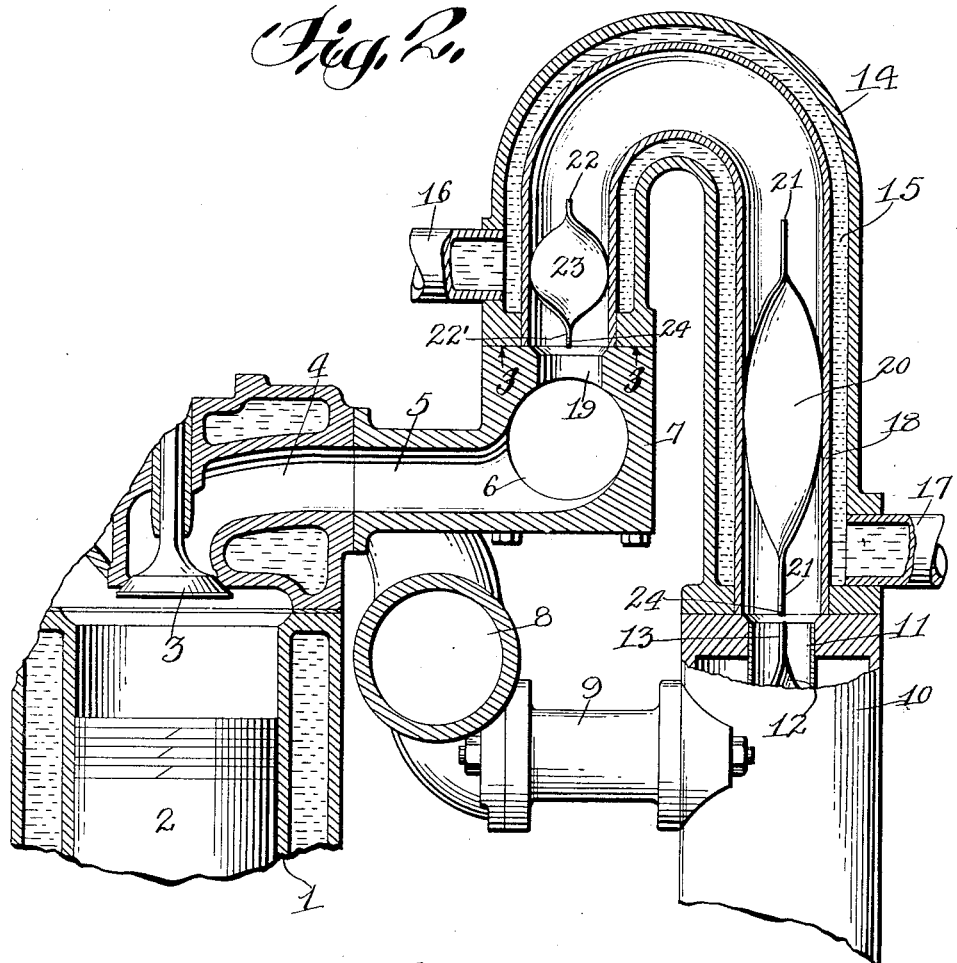
Figure 2 is a sectional view on the line 2—2 of Figure 1, with parts illustrated in elevation.

Referring more particularly to the drawings, it will be noted that 1 indicates the cylinder of an internal combustion engine in which is arranged the usual piston 2, the fuel to the piston being controlled by means of the valve 3 which is arranged at the inner end of the inlet conduit 4 in the cylinder head.

The outer end of the conduit 4 of each cylinder communicates with an intake conduit 5 which leads into the main conduit 6 of the intake manifold 7. Positioned directly below the intake manifold 7 is the exhaust manifold 8 and connected to the exhaust manifold 8 by means of a short connection 9 is a heater 10 which is used for heating the mixture of air and gas from the carburetor and within the heater is a tubular member 11 in which is arranged a spiral 12 having a blade-like end portion 13 which lies parallel with the manifold 7.

My improved cooler comprises in its construction a substantially inverted U-shaped casing or gooseneck 14, one end of which is arranged upon and connected to the heater 10, while the other and shorter end of the casing 14 is mounted upon and connected to the manifold 7.

The casing 14 preferably contains a cooling fluid in the form of water as shown at 15 and an inlet pipe 16 is connected to the casing at a point adjacent the manifold. This connection 16 is preferably connected to a pump operated by the motor so that the cooling fluid is injected into the casing 14 at a point adjacent the manifold 7 and thence is forced around in the casing and out through a discharge pipe 17 which preferably leads to the water jacket of the engine so that the cooling fluid, which is used for the casing 14 can be passed directly onto the cooling chambers of the motor.

Arranged within the casing 14 is a substantially U-shaped tube 18, with one end longer than the other, the longer end being arranged over the discharge end of the tube 11, while the shorter end is arranged over intake opening 19 in the upper side of the manifold 7. Arranged within the tube 18 at its intake end is a spiral member 20, each end formed with a blade-like portion 21, with the blade portion at one end preferably aligned with the blade 13 of the spiral 12, so that the mixed fuel is discharged from the tube 11 in a whirling motion and will strike the blade 21 and continue to whirl through contact with the spiral 20, thus directing the heated fuel against the cool walls of the tube 18 and cooling the fuel as it passes through the tube 18.

As the cool fuel reaches the discharge end of the tube 18, it will contact the inner blade 22 of the spiral member 23 and due to the fact that the spiral member 23 leads in a direction reversely to that of the spiral 20, the cooled fuel will be given a reverse movement, thus slackening the whirling motion to a certain extent so that as the fuel comes in contact with the blade 22' at the discharge end of the tube 18, it will be directed through the discharge opening 19 and into the manifold 7 in a comparatively smooth state with the whirling motion nearly eliminated.

Thus, it will be noted that as the fuel is discharged into the intake manifold 7, it will be equally distributed to the intake passages 5 which lead to the interior of the cylinders 1, so that each cylinder will receive its proportionate amount of cooled fuel.

It will be apparent that by first heating the liquid fuel and the air to be mixed therewith, the fuel is broken up so that the air can be mixed with the same and at the same time a considerable amount of expansion takes place which, if this could be cooled would add to the power of expansion of the fuel when fired in the engine cylinders and, therefore, it will be noted that by directing the mixed fuel which has been heated to a high temperature through the cooling conduit 18, it will provide for a certain amount of contraction of the expanded fuel so that as the fuel, after being thoroughly cooled is discharged into the engine cylinders, there will be greater volume of heavy unexpended fuel. Therefore, the cool fuel after being discharged into the cylinders and then fired has a greater expansion than fuel heated to a high temperature and then discharged into the cylinders and fired. In the former instance, it will be noted that with greater expansion due to the cooling of the fluid, a greater amount of power will result and be applied to the pistons of the engine.

It is believed from the foregoing that I have provided a simple and inexpensive device which can be attached to motor vehicles of various makes and to be positioned between the carburetor and intake manifold so as to cool the highly heated gases before they enter the cylinder of the engine in order to create a greater expansion of the fuel in the cylinders and thus provide for greater power.

It will be noted that the cooling fluid which is used for cooling the tube 18 can also be used for cooling the motor, and it will be noted that by positioning the spiral member 20 at the receiving end of the tube 18, the heated fuel mixture will be directed against the side walls of the tube 18 so that as the fuel passes through the tube, it will be properly cooled before reaching the spiral member 23, after which the whirling movement of the fuel is reversed, and due to the blade-like portion 22' will be directed into the manifold 7 in a comparatively smooth flow so that it will be evenly distributed to the different discharge conduits of the manifold and each cylinder of the engine will receive its proportionate amount.

In securing the spiral member 20 in position, the blade 21 at the inlet end of the tube 18 is provided with laterally disposed tongues 24 which fit into recesses 25 in the end of the tube 18.

Figure 3:
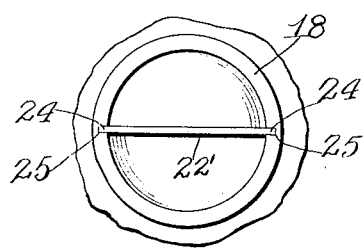
Figure 3 is a section on the line 3—3 of Figure 2.

The blade 22' of spiral 23 is also provided with tongues 24 which fit into recesses 25 at the discharge end of the tube 18, as shown in Figure 3, so as to retain these spiral members 20 and 23 in their proper positions relative to the tube 18. These spiral members 20 and 23 are formed from a single strip of metal, each strip being given a one-half or more turn, and provide the blades at each end, as illustrated.

Particular attention is directed to the fact that the blades at the ends of the spirals 20 and 23 are arranged parallel with the manifold 7 and by doing this, it will assure the proper whirling of the heated fuel as it enters the discharge tube 18 in order to bring this fuel into direct contact with the walls of the tube 18 and by reversing the whirling movement with the spiral 23, it will retard its whirling movement and through the positioning of blade 22' will direct the gases into the manifold as heretofore set forth.

It will be apparent that by using this improved method of first heating the mixed volatile fluid and air and generating gasoline gas, the fluid and air, and then cooling the same, it will provide for a greater expansion of the fuel in the engine cylinders, and thus increase the power derived from the fuel and impart the same to the pistons in the cylinder.

It will be noted in Figure 1 that I have illustrated in plan view the well known type of motor used on a well known type of motor vehicle, the motor being generally indicated at 26 and is provided with the usual exhaust manifold 27 and the intake manifold 7. The cooling fluid from the radiator is supplied through a conduit 29 which connects up with the water pump of the motor and the outlet 17 from the cooler is connected in the usual way with the lower end of the motor cooling jacket, as illustrated in Figure 1.

In directing the cooling fluid into the casing 14, it will be noted that the cooling fluid flows through the casing directly opposite to the flow of the fuel mixture, so as to positively assure the cooling of the mixture before it passes into the intake manifold 7.

While I have shown and described the preferred embodiment of my invention, it will be apparent that slight changes may be made in the construction when putting the invention into practice without departing from the spirit of the same or the scope of the appended claims.

I claim:

1. The combination with an internal combustion engine having an intake manifold and a carburetor, of a gooseneck charge conducting pipe having a long and a short leg, means connecting the short leg with the intake manifold, means connecting the long leg with the carburetor, means for heating and mixing the charge prior to the entrance thereof into the long leg of the gooseneck, means for cooling the walls of the legs of the gooseneck, means in said legs for causing the charge to flow past and contact with the cooled walls of said legs, said means in the legs including spirals, the spirals in one leg being formed opposite to the spiral in the other leg.

2. The combination with an internal combustion engine having an intake manifold and a carburetor, of a gooseneck charge conducting pipe having a long and a short leg, means connecting the short leg with the intake manifold, means connecting the long leg with the carburetor, means for heating and mixing the charge prior to the entrance thereof into the long leg, a water cooling jacket surrounding the gooseneck conducting pipe, a relatively long spiral arranged in the long leg of the gooseneck, and a short spiral arranged in the short leg adjacent to the intake manifold, the short spiral being formed opposite to the long spiral, whereby to reduce the whirling of the charge as the same enters the intake manifold.

JULIUS E. HAMACHECK.